United States Patent [19]

Addeo et al.

[11] Patent Number: 4,985,303
[45] Date of Patent: Jan. 15, 1991

[54] PROCESS FOR PREPARING HEAT-INSULATING STRUCTURAL ELEMENTS, AND PRODUCTS OBTAINED THEREBY

[75] Inventors: Antonio Addeo, Napoli; Alberto Bonvini, Milan; Romano Reggiani, Mantova; Annibale Vezzoli, Como, all of Italy

[73] Assignee: Centro Sviluppo Settori Impiego S.r.l., Milan, Italy

[21] Appl. No.: 556,440

[22] Filed: Jul. 24, 1990

[30] Foreign Application Priority Data

Jul. 26, 1989 [IT] Italy .................. 21336 A/89

[51] Int. Cl.$^5$ ................................. B32B 3/26
[52] U.S. Cl. ............................. 428/36.5; 264/126; 428/313.5; 428/316.6
[58] Field of Search ............ 264/126; 428/36.5, 313.5, 428/316.6

[56] References Cited

U.S. PATENT DOCUMENTS

| 3,262,834 | 7/1966 | Abell et al. | 264/126 |
| 4,087,501 | 5/1978 | Moser | 428/36.5 |
| 4,397,797 | 8/1983 | Nojiri et al. | 428/36.5 |

*Primary Examiner*—William J. Van Balen
*Attorney, Agent, or Firm*—Stevens, Davis, Miller & Mosher

[57] ABSTRACT

Process for preparing heat-insulating structural elements, which comprises the steps of:
(a) applying to the convex portion of a first half-shell a layer of beads made from a semi-foamed or foamed thermoplastic polymer, in order to produce a layer with an essentially constant thickness;
(b) sintering the beads; and
(c) applying to the so obtained composite a second half-shell capable of fitting the shape of the sintered layer.

11 Claims, No Drawings

PROCESS FOR PREPARING HEAT-INSULATING STRUCTURAL ELEMENTS, AND PRODUCTS OBTAINED THEREBY

FIELD OF THE INVENTION

The present invention relates to a process for preparing heat-insulating structural elements. More particularly, the present invention relates to a process for preparing heat-insulating elements, and to the so obtained products.

Still more particularly, the present invention relates to a process for preparing heat-insulating structural elements, according to which foamed materials are obtained by means for the use of foaming agents not belonging to the class of chlorofluoroalkanes.

By the term "heat-insulating structural elements", as used in the present disclosure and in the appended claims, any rigid, circular or polygonal structural elements for use in the sectors of transportation, of electrical home appliances, of building industry, of car industry, of telecommunications, of business machines, and so forth, as doors, covers, cases, in particular for refrigerators or freezers, panels, containers, e.g. for portable heat-insulated bags, and so forth, are meant.

BACKGROUND OF THE INVENTION

According to the prior art, the articles of the above reminded type are generally obtained by starting from two half-shells which are mechanically assembled by soldering or adhesive-bonding, with the hollow space defined inside the two half-shells being subsequently filled with foamed polyurethane.

According to another technique, disclosed in Italian patent application No. 21,815 A/87, a hollow case of thermoplastic polymer is formed by blow-molding, and said hollow case is then filled with a reactive polyurethanic mixture, which is then foamed.

Foamed polyurethane, used as the heat-insulating material in both of the above-described techniques, is obtained by starting from a formulation which is constituted by an organic diisocyanate, a polyol, a silicone surfactant, a polymerization catalyst and a foaming agent belonging to the class of chlorofluoroalkanes, such as Freon.

At present, the adoption of foamed polyurethane as a heat-insulating material causes problems of environmental character, in that the foaming agents of chlorofluoroalkane nature, such as Freon, are regarded as one among the main causes of alteration and destruction of the ozone layer existing in the stratosphere.

Unfortunately, replacing polyurethane with an equivalent material is a problem not easy to be solved, in that this polymer, by being foamed in situ according to the well-known R.I.M. (Reaction Injection Moulding) technique, makes it possible that rigid, self-supporting structural elements can be obtained even if the outer case is made from a thermoplastic polymer, and not from a metal sheet.

This outcome is due to the fact that polyurethane, by reacting in situ, perfectly adheres to the inner walls of the case, forming one single structural body with them.

The present Applicant has found now a process which makes it possible for heat-insulating structural elements to be obtained by using foamed thermopastic materials which do not require the use of chlorofluorocarbons as the foaming agents, and which, compared to the products according to the prior art, secure equal or better insulating characteristics --with their thickness being the same--simultaneously enabling the relevant technologies of production at the industrial level to be kept nearly unchanged.

SUMMARY OF THE INVENTION

Therefore, the subject-matter of the present invention is a process for preparing heat-insulating structural elements, which comprises the steps of:

(a) applying to the convex portion of a first half-shell a layer of beads made from a semi-foamed or foamed thermoplastic polymer, in order to produce a layer with an essentially constant thickness;
(b) sintering the beads;
(c) possibly drying the sintered layer; and
(d) applying to the so obtained composite a second half-shell capable of fitting the shape of the sintered layer.

DESCRIPTION OF THE INVENTION

The sintering of the beads can be carried out by means of high-temperature steam, hot air and/or radio-frequencies.

According to the process of the present invention, the beads of thermoplastic material have a substantially spherical shape with an average diameter comprised within the range of from 0.1 to 2 mm.

Any thermoplastic material capable of yielding foamed or semi-foamed beads can be used in the instant process, even if polystyrene, or impact-resistant polystyrene is preferred.

Examples of alternative materials are: polystyrene modified with polar monomers, e.g. acrylonitrile, polyolefins such as polyethylene, polypropylene, poly(vinyl chloride) and so forth, the acrylic or methacrylic resins, such as poly(methyl methacrylate), and so forth, or their mixtures.

The beads of thermoplastic material, in foamed or semi-foamed form, are products known in the art and available from the market under the trade name EXTIR, manufactured and traded by Motedipe S.p.A., Milan, or can be produced according to the process as disclosed in U.S. Pat. No. 2,983,692.

The sintering of the beads is preferably carried out with steam at a temperature comprised within the range of from 100° to 200° 'C.

The sintered layer has an essentially constant thickness lower than 10 cm, and generally comprised within the range of from 2 to 5 cm. Therefore, this layer reproduces the outline of the convex portion of the first half-shell.

At the end of the sintering step, the so obtained composite can be sent to a drying station, in order to eliminate any traces of moisture contained in it. The drying is preferably carried out when the sintering is carried out with steam, and is carried out under atmospheric pressure, at a temperature comprised within the range of from 50° to 70° C., possibly in the presence of air circulation.

The first half-shell is preferably constituted by one single piece, has a thickness comprised within the range of from 1 to 5 mm, and can be constituted by a plate of a thermoplastic polymer shaped according to the design of the heat-insulating structural element which one wants to produce.

Examples of thermoplastic polymers which can be used in order to prepare the first half-shell are: polystyrene, impact-resistant polystyrene, polystyrene modified with such polar monomers, e.g. acylonitrile, ABS resins, poly(vinyl chloride), high-, medium- and low-density polyethylene, polypropylene, acrylic or methacrylic resins such as poly(methyl methacrylate), polyphenylethers, polyester resins, such as PET, PBT, and so forth, or mixtures thereof.

Inasmuch as it does not perform a supporting action, but only of containment and protection of the heat-insulating layer, the second half-shell can be constituted by one single piece, or it can comprise a plurality of pieces, also made from different materials, such as, e.g., from metal plate or from a metal grid, which pieces are to be assembled with one another.

For example, when the heat-insulating structural element is a refrigerator cabinet, the second half-shell can consist of three pieces to be assembled with one another. The first two pieces, made from a metal sheet, are used in order to bound the side (external) walls of the cabinet, and the third piece, made from a metal grid, will be used in order to bound the bottom wall on which the coil for the heat exchange of the refrigerator fluid will be applied.

On the contrary, if the heat-insulating structural element represents, e.g., a refrigerator door, a second half-shell made from one single piece will be preferably used, so shaped as to fit the sintered layer.

The heat-insulating structural elements according to the present invention comprise hence a first half-shell, a heat-insulating layer constituted by a layer of beads made from a foamed or half-foamed thermoplastic polymer sintered on said first half-shell, and such as to reproduce the shape thereof, and a second half-shell used as a sealing element, capable of fitting the shape of the sintered layer.

The heat-insulating structural elements according to the present invention have a heat conductivity lower than 0.030 kcal/mh° C., as a function of their volumetric mass, as measured according to UNI 7819/7891/7745 standard, and a compression strength, according to UNI 6350 standard, higher than 1 kg/cm$^2$ and generally comprised within the range of from 1.8 to 2.9 kg/cm$^2$.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Process for preparing heat-insulating structural elements, which comprises the steps of:
   (a) applying to the convex portion of a first half-shell a layer of beads made from a semi-foamed or foamed thermoplastic polymer, in order to produce a layer with an essentially constant thickness;
   (b) sintering the beads;
   (c) possibly drying the sintered layer; and
   (d) applying to the so obtained composite a second half-shell capable of fitting the shape of the sintered layer.

2. Process according to claim 1, wherein the beads of thermoplastic material have a substantially spherical shape, and an average diameter within the range of from 0.1 to 2 mm.

3. Process according to claim 1, wherein the thermoplastic material capable of yielding foamed or semi-foamed beads is polystyrene, or impact-resistant polystyrene.

4. Process according to claim 1, wherein the sintering of the beads is carried out with steam at a temperature within the range of from 100° to 200° C. and the sintered layer is dried.

5. Process according to claim 1, wherein the sintering of the beads is carried out with hot air and/or with radio frequencies.

6. Process according to claim 1, wherein the sintered layer has an essentially constant thickness lower than 10 cm, and generally within the range of from 2 to 5 cm.

7. Process according to claim 1, wherein the drying of the sintered layer is carried out under atmospheric pressure, at a temperature within the range of from 50° to 70° C., optionally in the presence of air circulation.

8. Process according to claim 1, wherein the first half-shell is constituted by one single piece, and is made from a plate of a thermoplastic polymer.

9. Process according to claim 1, wherein the second half-shell is constituted by one single piece, or by a plurality of pieces to be assembled with one another.

10. Heat insulating, structural elements comprising a first half-shell, a heat-insulating layer constituted by a layer of beads made from a foamed or semi-foamed thermoplastic polymer sintered on said first half-shell, and such as to reproduce the shape thereof, and a second half-shell acting as a sealing element, capable of fitting the shape of the sintered layer.

11. Heat-insulating structural elements according to claim 10, having a heat conductivity lower than 0.030 kcal/mh° C., as measured according to UNI 7819/7891/7745 standard, and a compression strength, according to UNI 6350 standard, higher than 1 kg/cm$^2$ and generally comprised within the range of from 1.8 to 2.9 kg/cm$^2$.

* * * * *